US011526693B1

(12) United States Patent
Goldenberg et al.

(10) Patent No.: US 11,526,693 B1
(45) Date of Patent: Dec. 13, 2022

(54) SEQUENTIAL ENSEMBLE MODEL TRAINING FOR OPEN SETS

(71) Applicant: Amazon Technologies, Inc., Seattle, WA (US)

(72) Inventors: Roman Goldenberg, Haifa (IL); Miriam Farber, Haifa (IL); George Leifman, Haifa (IL); Gerard Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 16/865,167

(22) Filed: May 1, 2020

(51) Int. Cl.
*G06K 9/62* (2022.01)
*G06K 9/32* (2006.01)
*G06N 20/20* (2019.01)

(52) U.S. Cl.
CPC .......... *G06K 9/6257* (2013.01); *G06K 9/628* (2013.01); *G06K 9/6284* (2013.01); *G06N 20/20* (2019.01)

(58) Field of Classification Search
CPC .... G06K 9/6257; G06K 9/628; G06K 9/6284; G06N 20/20
See application file for complete search history.

(56) References Cited

U.S. PATENT DOCUMENTS

2018/0268292 A1* 9/2018 Choi .................... G06K 9/6217

OTHER PUBLICATIONS

Asif, U., Tang, J. and Harrer, S., 2019. Ensemble knowledge distillation for learning improved and efficient networks. arXiv preprint arXiv:1909.08097.*
Park, S. and Kwak, N., 2019. Feed: Feature-level ensemble forknowledge distillation. arXiv preprint arXiv: 1909.10754.*
Furlanello, T., Lipton, Z., Tschannen, M., Itti, L. and Anandkumar, A., Jul. 2018. Born again neural networks. In International Conference on Machine Learning (pp. 1607-1616). PMLR.*
Banfield, R. E. et al., A New Ensemble Diversity Measure Applied to Thinning Ensembles, In International Workshop on Multiple Classifier Systems, pp. 306-316, Springer, https://www.sandia.gov/~wpk/pubs/publications/MCS-2003.pdf, 2003, 9 pages.
Banfield, R. E. et al., Ensemble Diversity Measures and Their Application to Thinning, Information Fusion, 6(1):49-62, https://www.sandia.gov/~wpk/pubs/publications/infoFusion.pdf, 2005, 31 pages.

(Continued)

*Primary Examiner* — Zhitong Chen
(74) *Attorney, Agent, or Firm* — Athorus, PLLC

(57) ABSTRACT

Disclosed are systems and method for training an ensemble of machine learning models with a focus on feature engineering. For example, the training of the models encourages each machine learning model of the ensemble to rely on a different set of input features from the training data samples used to train the machine learning models of the ensemble. However, instead of telling each model explicitly which features to learn, in accordance with the disclosed implementations, ML models of the ensemble may be trained sequentially, with each new model trained to disregard input features learned by previously trained ML models of the ensemble and learn based on other features included in the training data samples.

20 Claims, 11 Drawing Sheets

(56) References Cited

OTHER PUBLICATIONS

Berk, R. A., An Introduction to Ensemble Methods for Data Analysis, Sociological Methods & Research, 34(3):263-295, https://www.researchgate.net/profile/Richard_Berk/publication/255584665_An_Introduction_to_Ensemble_Methods_for_Data_Analysis/links/0046353b2fb6512428000000/An-Introduction-to-Ensemble-Methods-for-Data-Analysis.pdf?origin=publication_detail, 2006, 35 pages.

Brown, G. et al., Managing Diversity in Regression Ensembles, Journal of Machine Learning Research, 6(Sep):1621-1650, http://jmlr.csail.mit.edu/papers/volume6/brown05a/brown05a.pdf, 2005, 30 pages.

Deng, J. et al., Arcface: Additive Angular Margin Loss for Deep Face Recognition, In Proceedings of the IEEE Conference on Computer Vision and Pattern Recognition, pp. 4690-4699, https://arxiv.org/pdf/1801.07698.pdf, 2019, 11 pages.

Dutt, A. et al., Coupled Ensembles of Neural Networks, Neurocomputing, Apr. 2019, 12 pages.

Geman, S. et al., Neural Networks and the Bias/Variance Dilemma, Neural Computation, 4(1):1-58, https://www.ics.uci.edu/~smyth/courses/cs274/readings/bias_variance.pdf, 1992, 58 pages.

Guo, Y. et al., MS-Celeb-1M: A Dataset and Benchmark for Large-Scale Face Recognition, In European Conference on Computer Vision, pp. 87-102. Springer, https://www.microsoft.com/en-us/research/wp-content/uploads/2016/08/MSCeleb-1M-a.pdf, 2016, 17 pages.

He, K. et al., Deep Residual Learning for Image Recognition, In Proceedings of the IEEE Conference on Computer Vision and Pattern Recognition, pp. 770-778, https://www.cv-foundation.org/openaccess/content_cvpr_2016/papers/He_Deep_Residual_Learning_CVPR_2016_paper.pdf, 2016, 9 pages.

Huang, G. B. et al., Labeled Faces in the Wild: A Database for Studying Face Recognition in Unconstrained Environments, http://vis-www.cs.umass.edu/papers/lfw.pdf, 2008, 11 pages.

Huang, G. et al., Densely Connected Convolutional Networks, In Proceedings of the IEEE Conference on Computer Vision and Pattern Recognition, pp. 4700-4708, http://openaccess.thecvf.com/content_cvpr_2017/papers/Huang_Densely_Connected_Convolutional_CVPR_2017_paper.pdf, 2017, 9 pages.

Ko, A. H.-R. et al., Compound Diversity Functions for Ensemble Selection, International Journal of Pattern Recognition and Artificial Intelligence, 23(04):659-686, https://www.etsmtl.ca/ETS/media/ImagesETS/Labo/LIVIA/Publications/2009/Ko_IJPRAI_2009.pdf, 2009, 28 pages.

Krizhevsky, A., Learning Multiple Layers of Features from Tiny Images, https://pdfs.semanticscholar.org/5d90/f06bb-70a0a3dced62413346235c02b1aa086.pdf?_ga=2.50336553.1232988135.1589847237-1985355348.1527123823, 2009, 60 pages.

Krogh A. and Vedelsby, J. Neural Network Ensembles, Cross Validation, and Active Learning, In NIPS, http://papers.nips.cc/paper/1001-neural-network-ensembles-cross-validation-and-active-learning.pdf, 1994, 8 pages.

Kuncheva, L. I., Combining Pattern Classifiers: Methods and Algorithms, John Wiley & Sons, 2014.

Leng, Q. et al., A Survey of Open-World Person Re-Identification, IEEE Transactions on Circuits and Systems for Video Technology, https://www.researchgate.net/profile/Mang_Ye/publication/331058466_A_Survey_of_Open-World_Person_Re-identification/links/5d85f88c92851ceb7921945e/A-Survey-of-Open-World-Person-Re-identification.pdf?origin=publication_detail, 2019, 19 pages.

Liang, S. et al., Enhancing the Reliability of Out-Of-Distribution Image Detection In Neural Networks, arXiv preprint arXiv:1706.02690, https://arxiv.org/pdf/1706.02690.pdf, 2017, 22 pages.

Liu, Y. and Yao, X. Ensemble Learning via Negative Correlation, Neural Networks, 12:1399-1404, http://citeseerx.ist.psu.edu/viewdoc/download?doi=10.1.1.45.9726&rep=rep1&type=pdf, 1999, 19 pages.

Mordvintsev, A. et al., Inceptionism: Going Deeper into Neural Networks, https://ai.googleblog.com/2015/06/inceptionism-going-deeper-into-neural.html, Jun. 17, 2015, 7 pages.

Ross, A. S. et al., Ensembles of Locally Independent Prediction Models, arXiv preprint arXiv:1911.01291, https://arxiv.org/pdf/1911.01291.pdf, 2019, 10 pages.

Shi, Z. et al., Crowd Counting with Deep Negative Correlation Learning, In Proceedings of the IEEE Conference on Computer Vision and Pattern Recognition, pp. 5382-5390, http://openaccess.thecvf.com/content_cvpr_2018/papers/Shi_Crowd_Counting_With_CVPR_2018_paper.pdf, 2018, 9 pages.

Shipp, C. A. and Kuncheva, L. I., Relationships Between Combination Methods and Measures of Diversity in Combining Classifiers, Information Fusion, 3(2):135-148, http://citeseerx.ist.psu.edu/viewdoc/download;jsessionid=47FF61A9824AC18513C1CDD9177EC0D0?doi=10.1.1.454.7460&rep=rep1&type=pdf, 2002, 14 pages.

Shoham, R. and Permuter, H., Amended Cross-Entropy Cost: An Approach for Encouraging Diversity in Classification Ensemble (Brief Announcement), In International Symposium on Cyber Security Cryptography and Machine Learning, pp. 202-207, Springer, 2019.

Srivastava, Y. et al., A Performance Comparison of Loss Functions for Deep Face Recognition, arXiv preprint arXiv:1901.05903, https://arxiv.org/pdf/1901.05903v1.pdf, 2019, 8 pages.

Ueda, N. and Nakano, R., Generalization Error of Ensemble Estimators, In Proceedings of International Conference on Neural Networks (ICNN'96), vol. 1, pp. 90-95. IEEE, 1996, 6 pages.

Webb, A. M. et al., Joint Training of Neural Network Ensembles, arXiv preprint arXiv:1902.04422, https://arxiv.org/pdf/1902.04422.pdf, 2019, 14 pages.

Wilcox, K. T., An Introduction to Ensemble Methods for Machine Learning, 2016.

Yoshihashi, R. et al., Classification-reconstruction Learning for Open-Set Recognition, In Proceedings of the IEEE Conference on Computer Vision and Pattern Recognition, pp. 4016-4025, http://openaccess.thecvf.com/content_CVPR_2019/papers/Yoshihashi_Classification-Reconstruction_Learning_for_Open-Set_Recognition_CVPR_2019_paper.pdf, 2019, 10 pages.

Yu, Y. et al., Diversity Regularized Machine, In Twenty-Second International Joint Conference on Artificial Intelligence, https://www.ijcai.org/Proceedings/11/Papers/269.pdf, 2011, 6 pages.

Zheng, L. et al., Scalable Person Re-Identification: A Benchmark, In Proceedings of the IEEE International Conference on Computer Vision, pp. 1116-1124, https://www.cv-foundation.org/openaccess/content_iccv_2015/papers/Zheng_Scalable_Person_Re-Identification_ICCV_2015_paper.pdf, 2015, 9 pages.

Zheng, W.-S. et al., Towards Open-World Person Re-Identification By One-Shot Group-Based Verification. IEEE Transactions on Pattern Analysis and Machine Intelligence, 38(3):591-606, https://www.eecs.qmul.ac.uk/~sgg/papers/ZhengEtAl_PAMI2015_TREID.pdf, 2015, 14 pages.

Zheng, Z. et al., Joint Discriminative and Generative Learning for Person Re-identification, IFFE Conference on Computer Vision and Pattern Recognition (CVPR), https://www.researchgate.net/profile/Zhedong_Zheng/publication/338509853_Joint_Discriminative_and_Generative_Learning_for_Person_Re-Identification/links/5e4f1a93299bf1cdb9391cb0/Joint-Discriminative-and-Generative-Learning-for-Person-Re-Identification.pdf?origin=publication_detail, 2019, 11 pages.

* cited by examiner

US 11,526,693 B1

SEQUENTIAL ENSEMBLE MODEL TRAINING FOR OPEN SETS

BACKGROUND

Machine learning models are being used for various types of projects. Additionally, ensembles of models, which are groups of two or more machine learning models, have been used recently to boost accuracy of a machine learning system. It is generally accepted that diversity between ensemble models is important for leveraging the strength of ensemble approaches.

Typically, machine learning models that compose an ensemble are trained independently and the diversity among the models is achieved by training the models using different training sets or different/randomized ordering of data samples of the training sets.

BRIEF DESCRIPTION OF DRAWINGS

The detailed description is described with reference to the accompanying figures.

DETAILED DESCRIPTION

Figure 1:
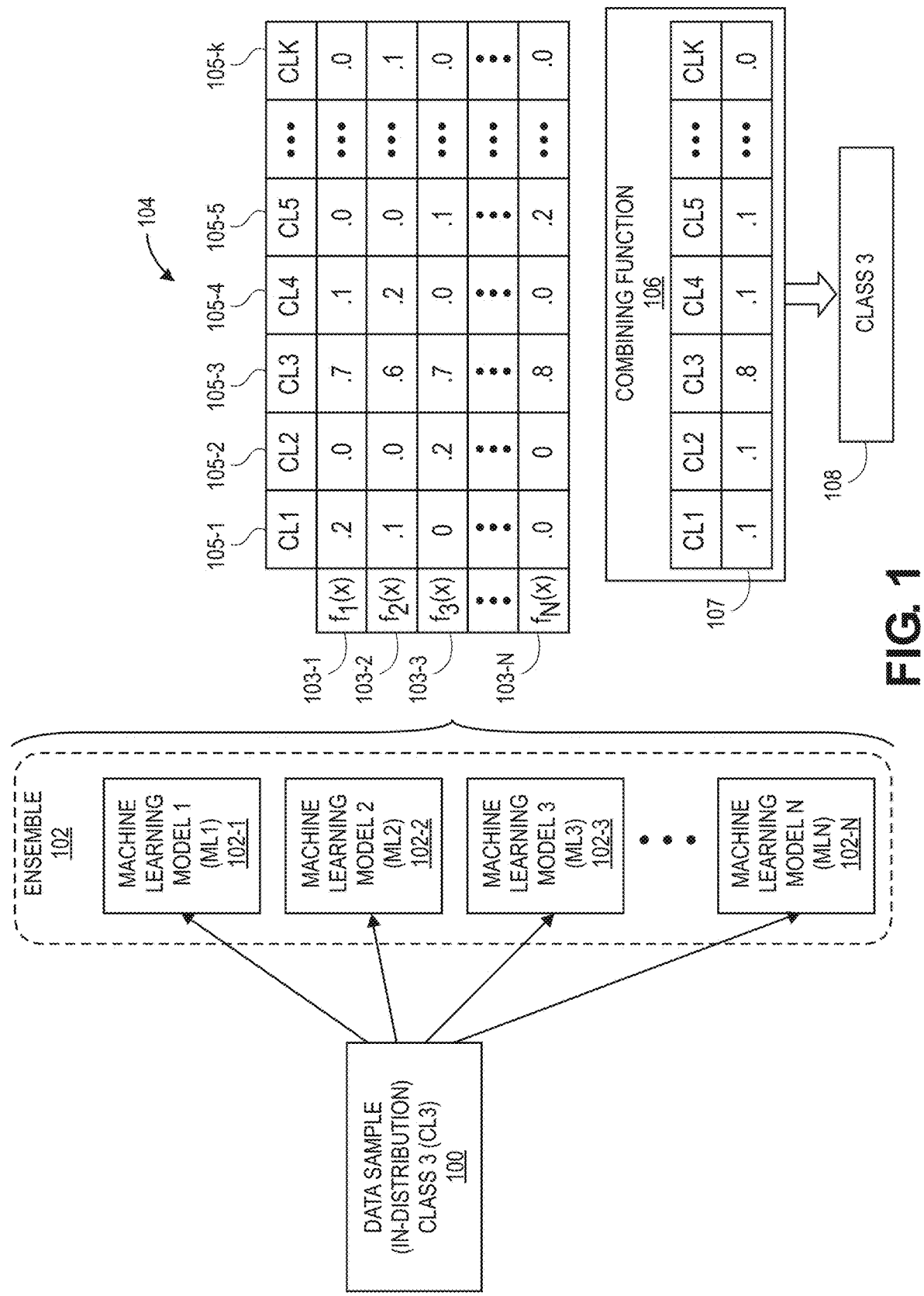
FIG. 1 is a block diagram illustrating an ensemble of machine learning models that determines a class for an in-distribution data sample, in accordance with described implementations.

Described are systems and method for training machine learning ("ML") models of an ensemble of models that are de-correlated. In accordance with some implementations, two or more ML models may be concurrently trained (e.g., co-trained) while adding a decorrelation component to one or both models that decreases the pairwise correlation between the outputs of the models. However, unlike traditional approaches, in accordance with the disclosed implementations, only the negative results need to be decorrelated. Negative results, as used herein, are the probability values determined by the ML models for classes that do not correspond to a class of the input data sample. For example, if the output of each model is a probability vector indicating the probability of an input imaging belonging to one of K known classes, the disclosed implementations train the models to provide inter-model disagreement only for the K−1 vector components that correspond to the incorrect classes for the input data sample.

In accordance with another implementation, ML models of an ensemble may be trained with a focus on feature engineering. In such implementations, the training of the models encourages each ML model of the ensemble to rely on a different set of input features from the training data samples used to train the ML models of the ensemble. However, instead of telling each model explicitly which features to learn, in accordance with the disclosed implementations, ML models of the ensemble may be trained sequentially, with each new model trained to disregard input features learned by previously trained ML models of the ensemble and learn based on other features included in the training data samples. For example, the first ML model of the ensemble may be trained on the training data samples without any feature restrictions. The features learned by the first ML model may then be determined and those features, referred to herein as distilled features, encoded into distilled data samples. The second ML model may then be trained on the training data samples and the distilled data samples such that the second ML model fails on the distilled data samples but succeeds on the original training data. As a result, the second ML model learns different features than those of the first model.

In the disclosed implementations we let ensemble E= (F,M) be defined by a collection of n models F={$f_1$, $f_2$, ..., $f_n$} and a combining function M For an input data sample x, each ML model of the ensemble produces a K-length probability vector $f_i(x)=(f_i^1(x), f_i^2(x), ..., f_i^K(x))$. A combining function M ($f_1(x), f_2(x), ..., f_n(x)$) merges individual model outputs to produce the final ensemble result. Typical examples of combining functions are averaging $M_{ave}(x)=\frac{1}{2}\Sigma_{i=1}^n f_i(x)$ and majority voting.

While some of the discussion of the disclosed implementations are described herein with respect training an ensemble of ML models to classify images of an open set, the disclosed implementations are applicable to classification of any type of data sample for which a signal or embedding vector can be determined. For example, the disclosed implementations may be used to train an ensemble that classifies any of a variety of types of data samples including, but not limited to, audio signals, text, images, etc.

FIG. 1 is a block diagram illustrating an ensemble 102 of machine learning models 102-1, 102-2, 102-3, through 102-N that determines a class for an in-distribution data sample 100, in accordance with described implementations.

As discussed herein, for purposes of illustration, for each of the training implementations discussed herein (e.g., co-training with diversity loss and sequential training), the ML models 102-1 through 102-N of an ensemble 102 are trained to each output a probability vector 103-1, 103-2, 103-3, through 103-N, respectively, indicating the probability of an input data sample 100 belonging to one of K known classes, in this example classes CL1 105-1, CL2 105-2, CL3 105-3, CL4 105-4, CL5 105-5 through CLK 105-K.

As illustrated in FIG. 1, in accordance with disclosed implementations, when an in-distribution data sample 100 is provided to a trained ensemble 102 of ML models 102-1 through 102-N, each model generates a probability vector f(x) that assigns a probability to each of K classes. In the example illustrated in FIG. 1, the input data sample 100 corresponds to class three (CL3). Each of the ML models 102-1 through 102-N generate respective probability vectors $f_1(x)$ 103-1, $f_2(x)$ 103-2, $f_3(x)$ 103-3 through $f_N(x)$ 103-N that assign probability scores to each class for the input data sample. As illustrated, in this example, because the input data sample is an in-distribution data sample that corresponds to class three, each ML model of the ensemble 102 assigns a high probability score to CL3 105-3 in the respective probability vectors 103-1 through 103-N. However, because the models are trained with the disclosed implementations to be de-correlated for incorrect classes, in this example all classes expect CL3 105-3, each ML model of the ensemble assigns different probabilities to the different incorrect classes, also referred to herein as wrong classes. For example, referring to probability vector 103-1 generated by the first ML model 102-1 of the ensemble, it assigned the following probabilities of 0.2 to class CL1 105-1, 0.0 to class CL2 105-2, 0.7 to class CL3 105-3, 0.1 to class CL4 105-4, 0.0 to class CL5 105-5, and 0.0 to class CLK 105-K. In comparison, the second ML model 103-2 of the ensemble assigned the following probabilities of 0.1 to class CL1 105-1, 0.0 to class CL2 105-2, 0.6 to class CL3 105-3, 0.2 to class CL4 105-4, 0.0 to class CL5 105-5, and 0.1 to class CLK 105-K. The third ML model 103-3 of the ensemble 102 assigned the following probabilities of 0.0 to class CL1 105-1, 0.2 to class CL2 105-2, 0.7 to class CL3 105-3, 0.0 to class CL4 105-4, 0.1 to class CL5 105-5, and 0.0 to class CLK 105-K. The Nth ML model 103-N of the ensemble 102 assigned the following probabilities of 0.0 to class CL1 105-1, 0.0 to class CL2 105-2, 0.8 to class CL3 105-3, 0.0 to class CL4 105-4, 0.2 to class CL5 105-5, and 0.0 to class CLK 105-K. As illustrated, with the ML models of the ensemble trained in accordance with the disclosed implementations, the ML models agree on the correct class but determine different probability values for the other classes of the set of classes (i.e., present disagreement for incorrect classes).

Continuing with the example illustrated in FIG. 1, the combining function 106 of the ensemble 102 uses the results 104 from each ML model of the ensemble to determine an ensemble results 108, in this example an ensemble result indicating that the ensemble determined that the input data sample 100 corresponds to class three CL3 105-3. As noted above, in some implementations, the ensemble result may be determined by averaging or combining the probability scores 104 for each class from each probability vector, such as the averaged probability vector 107. In other examples, the ensemble may determine the class based on a majority vote determined if a majority of the ML models of the ensemble rank the same class higher than other classes.

Figure 2:
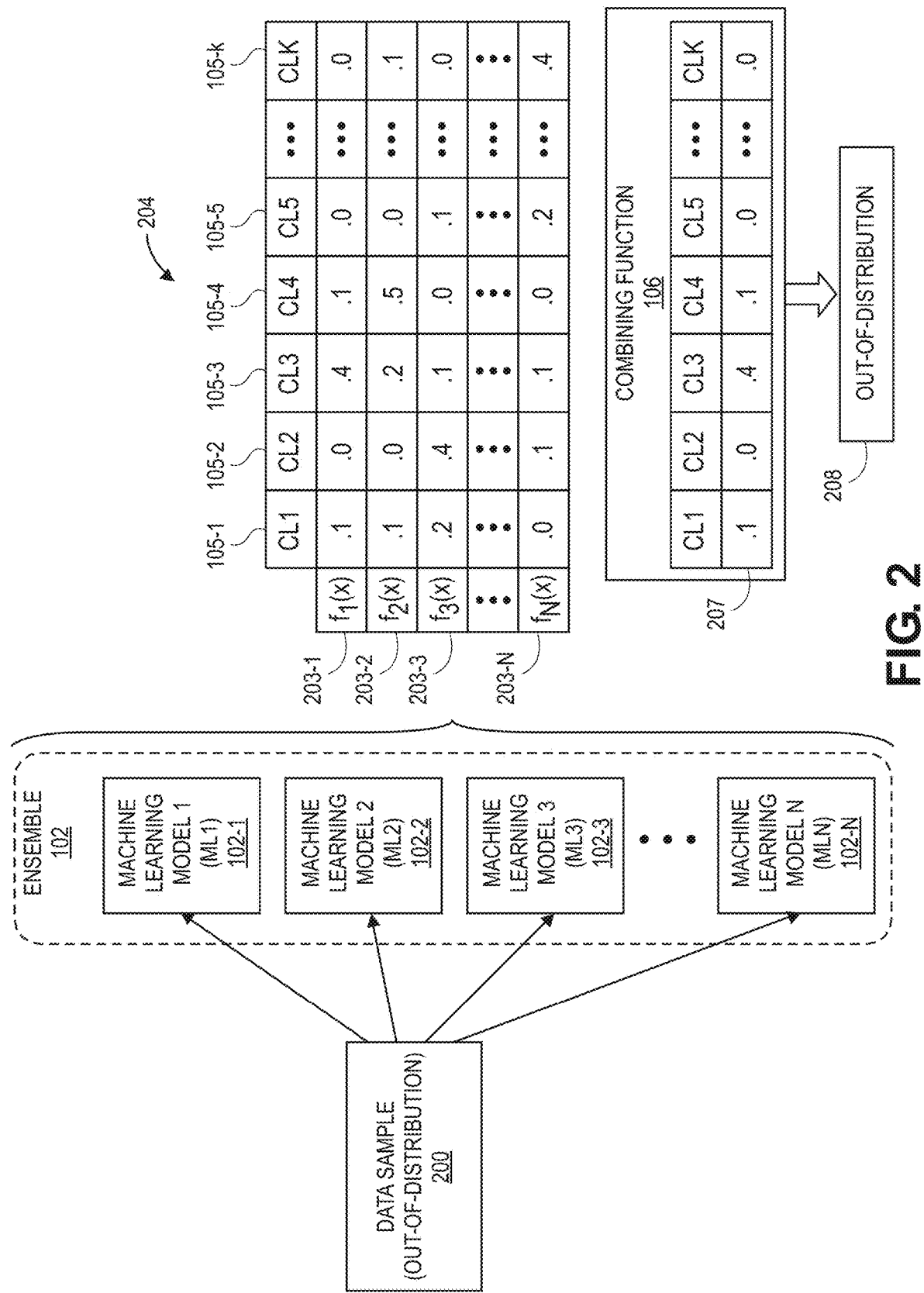
FIG. 2 is a block diagram illustrating the ensemble of machine learning models that determines an out-of distribution data sample is not part of a class, in accordance with described implementations.

FIG. 2 is a block diagram illustrating the ensemble 102 of machine learning models 102-1, 102-2, 102-3, through 102-N determining that an out-of distribution data sample 200 is not part of a class, in accordance with described implementations.

As illustrated in FIG. 2, in accordance with disclosed implementations, when an out-of distribution data sample 200 is provided to a trained ensemble 102 of ML models 102-1 through 102-N, each model generates a probability vector $f_i(x)$ that assigns a probability to each of K classes. In the example illustrated in FIG. 2, the input data sample 200 does not correspond to any of the K classes (i.e., the data sample is out-of distribution). Each of the ML models 102-1 through 102-N generate respective probability vectors $f_1(x)$ 203-1, $f_2(x)$ 203-2, $f_3(x)$ 203-3 through $f_N(x)$ 203-N that assign probability scores to each class for the input data sample. As illustrated, in this example, because the models are trained with the disclosed implementations and because the input data sample does not correspond to any class, each ML model of the ensemble 102 assigns varying probability scores to each of the classes 105-1 through 105-K in the respective probability vectors 203-1, 203-2, 203-3, through 203-N. For example, referring to probability vector 203-1 generated by the first ML model 102-1 of the ensemble, it assigned the following probabilities of 0.1 to class CL1 105-1, 0.0 to class CL2 105-2, 0.4 to class CL3 105-3, 0.1 to class CL4 105-4, 0.0 to class CL5 105-5, and 0.0 to class CLK 105-K. In comparison, the second ML model 203-2 of the ensemble assigned the following probabilities of 0.1 to class CL1 105-1, 0.0 to class CL2 105-2, 0.2 to class CL3 105-3, 0.5 to class CL4 105-4, 0.0 to class CL5 105-5, and 0.1 to class CLK 105-K. The third ML model 203-3 of the ensemble 102 assigned the following probabilities of 0.2 to class CL1 105-1, 0.4 to class CL2 105-2, 0.1 to class CL3 105-3, 0.0 to class CL4 105-4, 0.1 to class CL5 105-5, and 0.0 to class CLK 105-K. The Nth ML model 203-N of the ensemble 102 assigned the following probabilities of 0.0 to class CL1 105-1, 0.1 to class CL2 105-2, 0.1 to class CL3 105-3, 0.0 to class CL4 105-4, 0.2 to class CL5 105-5, and 0.4 to class CLK 105-K. As illustrated, with the ML models of the ensemble trained in accordance with the disclosed implementations, the ML models do not agree on any class for out-of distribution input data samples, such as input data sample 200.

Continuing with the example illustrated in FIG. 2, the combining function 106 of the ensemble 102 uses the results 204 from each ML model of the ensemble to determine an ensemble results 208, in this example an ensemble result indicating that the ensemble determined that the input data sample 200 is out-of distribution. In some implementations, the ensemble result may be determined by averaging or combining the probability scores for each class from each probability vector, such as the averaged probability vector 207. As illustrated in the averaged probability vector 207, because of the varying results for each class, all of the averaged probability scores for an out-of distribution input data sample result in low probability scores. In other examples, the ensemble may determine that the input is out-of distribution because there is no majority agreement as to class for the input data sample.

Figure 3:
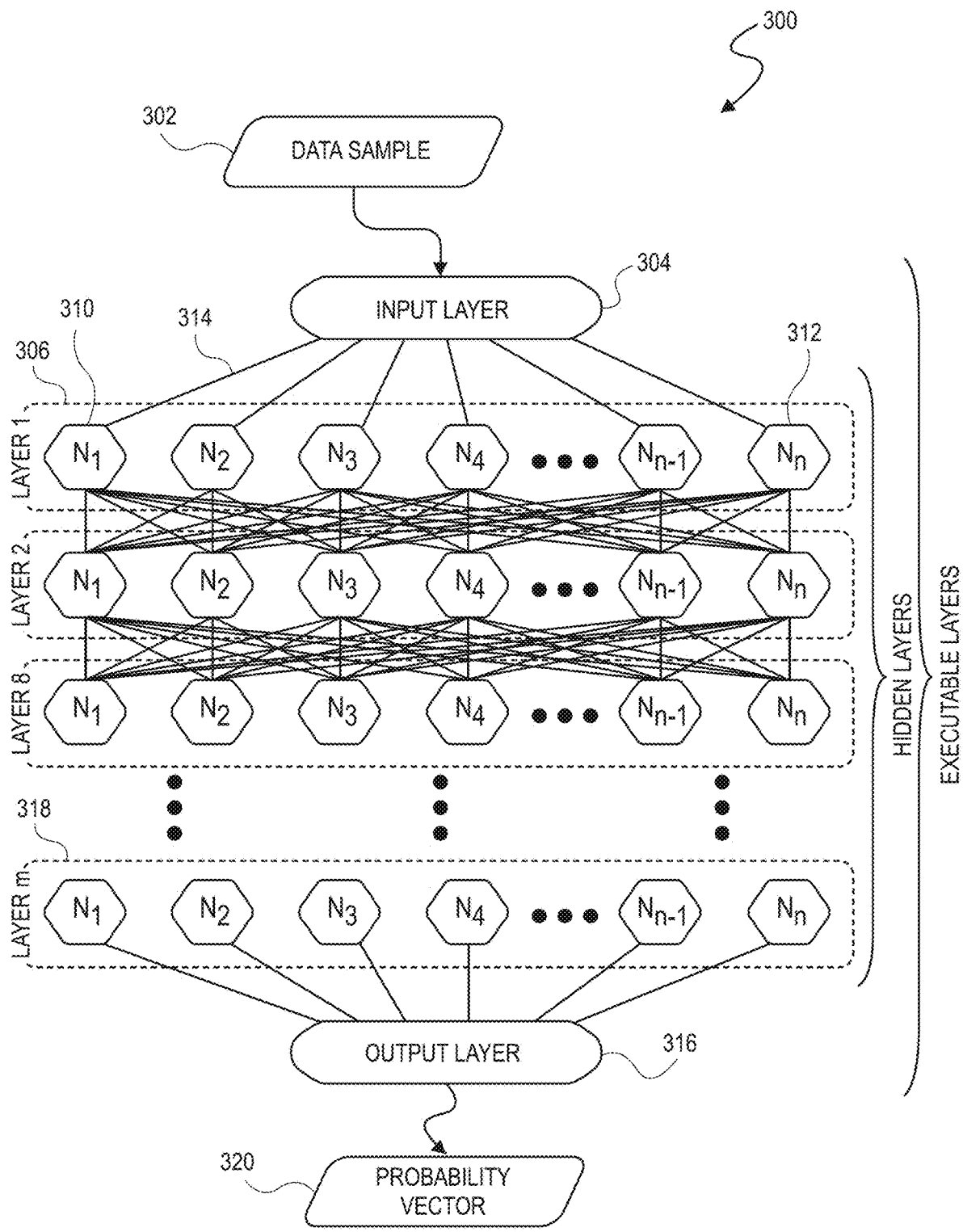
FIG. 3 is a block diagram illustrating exemplary components of a machine learning model which can be suitably trained to classify input data samples, in accordance with described implementations.

FIG. 3 is a block diagram illustrating exemplary components of a machine learning model 300, also called a deep neural network, which can be suitably trained to classify input data samples, in accordance with aspects of the disclosed subject matter.

As those skilled in the art will appreciate, a machine learning model 300 comprises multiple executable layers, including an input layer 304, an output layer 316, and one or more hidden layers. By way of illustration, the exemplary machine learning model 300 includes m hidden layers, including hidden layers 306 and 318. The input layer 304 accepts the input data sample 302, such as an image, audio, text, etc., for which the machine learning model 300 is to classify the data sample into one of a plurality of classes.

The input layer 304 accepts the input data sample and, according to one or more predetermined algorithms and/or heuristics embedded within the various layers, maps the input through a series of process layers, each layer outputting values. These values, not shown in FIG. 3 but implied by the various edges, such as edge 314, extending from the input layer 304 to the various processing nodes of the first hidden layer 306, constitute at least some of the output of the input layer and are distributed as input data or input values to processing nodes of the first hidden layer 306 of the machine learning model 300, such as processing nodes 310 and 312.

Typically, though not exclusively, the one or more values or facets of the input data sample passed from the input layer 304 to a first processing node in the first hidden layer, such as processing node 310 of hidden layer 306, is different than a value/facet passed to a second processing node of that same hidden layer, such as to processing node 312 of hidden layer 306.

Each hidden layer, including hidden layers 306 and 318, comprises a plurality of processing or convolutional nodes. By way of illustration and not limitation, hidden layer 306 includes n processing nodes, $N_1$-$N_n$. While the processing nodes of the first hidden layer 306 typically, though not exclusively, have a single input value from the input layer 304, processing nodes of subsequent hidden layers typically have input values from one or more processing nodes of the previous input layer. Of course, in various implementations, the processing nodes of the first hidden layer 306 may receive, as input values, all output values of the input layer 304.

In various implementations and as illustrated in the executable machine learning model 300, each hidden layer (except for the first hidden layer 306) accepts input data/signals from each processing node of the prior hidden layer, as indicated by the edges proceeding from a processing node of an "upper" hidden layer (e.g., layer 306) to a "lower" hidden layer. Of course, alternative implementations need not include such wide distribution of output values to the processing nodes of a subsequent, lower level.

Each processing node implements one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolutions and computations. Hyperparameters (data/values that are input from sources external to processing nodes of a prior input level) may also be utilized by all or some of the processing nodes of a hidden layer.

As will be appreciated by those skilled in the art, one of the interesting aspects of training machine learning models is that the various executable levels are adaptable to accommodate self-learning. In other words, when provided feedback, modifications are made to the weights, parameters, and processing or convolutional operations of the processing nodes in the various layers, in order to achieve better results. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning model, the machine learning model adaptively makes its own determinations as to how to modify each computation, convolution or transformation of a given processing node to produce better and/or superior results from the input values it receives. As discussed herein, these determinations may be guided by adjustments to the training data samples and/or the loss function used during training of the machine learning model.

At the final hidden layer, e.g., layer 318, the processing nodes provide their output data to the output layer 316. The output layer 316 performs whatever final aggregations, calculations, transformations, projections, normalizations and/or interpretations of the various items of input data to produce a probability vector 320 that includes a probability score for each of a plurality of classes indicating a probability that the input data sample corresponds to the class.

Some traditional approaches to impose and analyze ensemble diversity is through a loss function utilized at training of the ML models of the ensemble. For example, traditional loss functions for models composing an ensemble would typically include a "data fidelity" component, which could be identical to the loss for a single model, and a decorrelation component. A typical decorrelation component discourages correlation between ensemble models. However, this duality results in a trade-off between the data fidelity component and the decorrelation component. Specifically, the data fidelity component encourages all models to yield the same correct result, that is, to be correlated. The decorrelation component asks the opposite, to be decorrelated. This trade-off works for closed set problems, where a correct output is expected for any valid input. However, for open set problems, the quality and accuracy of the ensemble degrades rapidly.

As noted above, for purposes of the discussion herein, the implementations are described for a K-class classification problem. However, it will be appreciated, that the disclosed implementations are equally applicable to training identification models, where classes correspond to identities in the training set, and/or to other identification or classification models.

In addition to the above notations, for the disclosed implementations, the ground-truth class for a data sample x is defined as $q(x) \in \{1, 2, \ldots, K\}$. The individual loss (the loss used to train each individual ensemble model $f_i$) may be denoted as $L(x) = L(f_i(x), q(x))$. If ensemble and individual ML model outputs are of the same form, the same loss L may be applied to the ensemble output to yield a joint ensemble loss:

$$L_{joint}(x) = L(M(x), q(x)) \tag{1}$$

An example individual loss function for classification problems is the cross-entropy loss:

$$L_{CE}(x) = -\sum_{j=1}^{K} q(x) \log(f_i^j(x)) \tag{2}$$

For identification problems, the cross-entropy loss may be combined with additional loss components.

Figure 4:
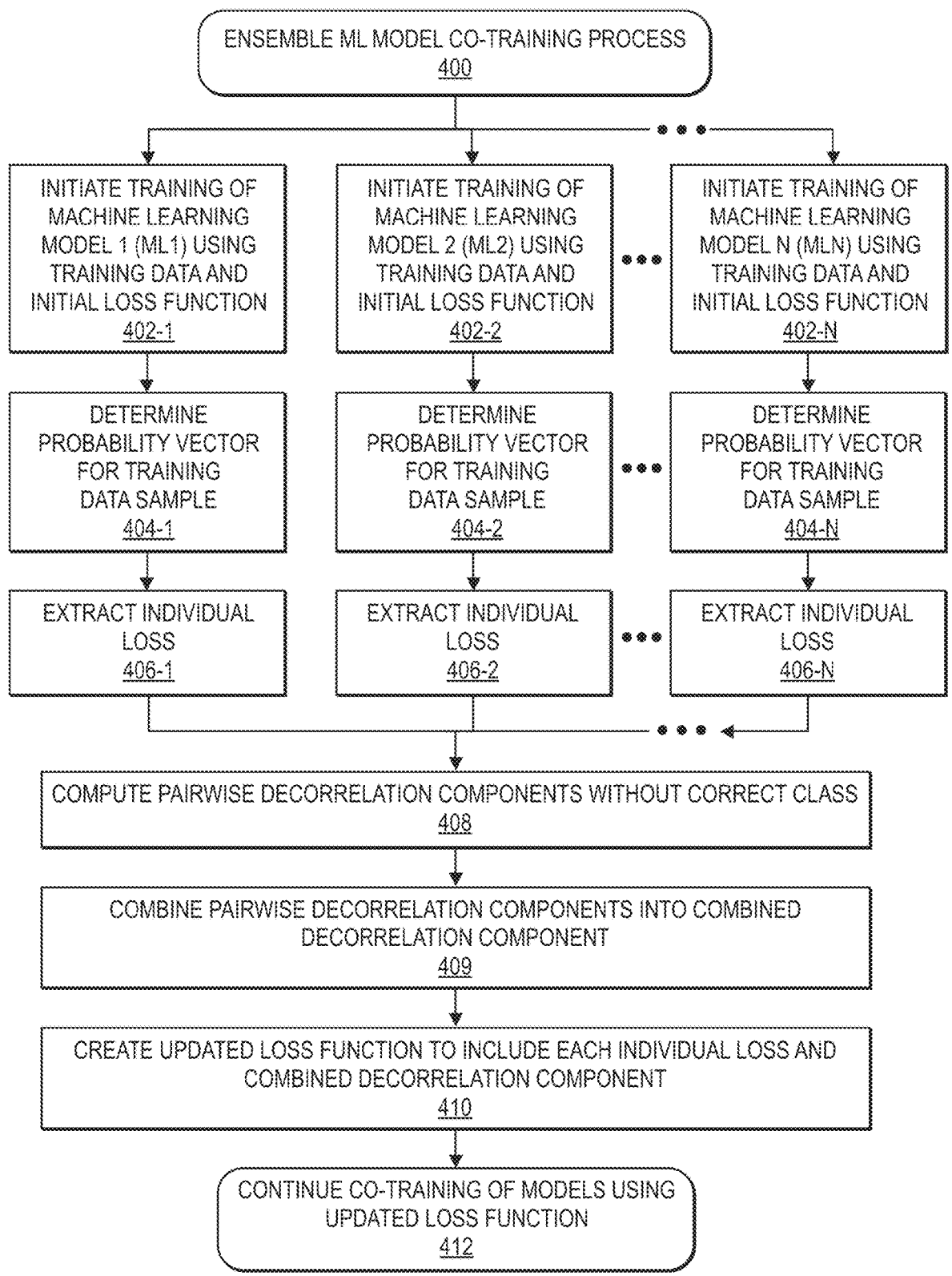
FIG. 4 is an example ensemble machine learning model co-training process, in accordance with described implementations.

FIG. 4 is an example ensemble machine learning model co-training process 400, in accordance with described implementations.

Training of the ML models assumes the ensemble includes at least two models and up to as many as N models, each of which are trained concurrently, as illustrated by blocks 402-1, 402-2 through 402-N. Concurrent training of the models begins with an initial loss function and each model is concurrently trained using training data 403 that corresponds to in-distribution data samples.

To train the models to disagree on unknown class data, the example process determines a first probability vector for a training data sample as determined by the first ML model, as in 404-1 and concurrently determines a second probability vector for that same training data sample as determined by the second ML model, as in 404-2. Likewise, if there are more than two models, each additional model is also concurrently trained with the first two models and a probability vector for the same training data sample determined for each additional ML model, as in 404-N. Individual loss functions for each model may then be extracted based on the determined probability vectors, as in 406-1, 406-2, through 406-N.

Based on the number of models being trained, a pairwise decorrelation component is determined for each pair of models, as in 408. For example, if there are three models ML1, ML2, and MLN, three pairwise decorrelation components will be determined—a first pairwise decorrelation component based on the probability vectors determined by ML1 and ML2, a second pairwise decorrelation component based on the probability vectors determined by ML1 and MLN, and a third pairwise decorrelation component based on the probability vectors determined by ML2 and MLN. Each pairwise decorrelation component excludes the correct class component of each probability vector as determined by the machine learning models such that the resulting pairwise decorrelation component does not include a correct class component.

For example, if x is a valid training sample of class $q(x) \in [1, 2, \ldots, K]$, the vector obtained from $f_i(x)$ by omitting the $q(x)^{th}$ component may be denoted by:

$$f_i \backslash q(x) = (f_i^1(x), \ldots f_i^{q(x)-1}(x), f_i^{q(x)+1}(x), \ldots, f_i^n(x))$$

Disagreement may then be achieved between $f_i \backslash q(x)$ and $f_j \backslash q(x)$ for every pair of ML models i and j.

The example process 400 then determines a combined decorrelation component based on each of the determined pairwise decorrelation components, as in 409.

Different diversity measures may be used to drive inter-model disagreement. For example, a cross-entropy component may be used. In other examples, a decorrelation component, such as $\text{Corr}(f_i \backslash q(x), f_j \backslash q(x))$ may be used as the loss component to encourage disagreement between wrong classes.

For ensembles that include trained ML models that are co-trained with respect to the example process 400 (FIG. 4), the combining function that combines the probability vectors determined from each ML model of the ensemble may use a rank order correlation, such as Spearman's correlation. In other examples, a Pearson correlation may be used. For example, using Pearson's correlation pairwise decorrelation component may be defined as $$L_{Corr}(x) = \frac{1}{\binom{n}{2}} \sum_{1 \leq i < j \leq n} \text{Corr}(f_i \backslash q(x), f_j \backslash q(x)) \qquad (8)$$

Likewise, the data fidelity component may be determined as the average cross entropy loss. As a result, the combined decorrelation component may be given by:

$$\text{Combined\_Decorrelation}(x) = \frac{1-\alpha}{n} \sum_{i=1}^{n} L_{CE}(q(x), f_i(x)) + \alpha L_{Corr}(x) \qquad (9)$$

where $\alpha$ controls the relative weight between the individual model accuracy and the diversity.

Returning to the example process 400, the initial loss function may then be updated to create an updated loss function that includes the individual loss of each co-trained ML model, ML1, ML2 through MLN, and the combined decorrelation component, as in 410. Creating an updated loss function that includes each individual loss of the co-trained models of ensemble and the decorrelation component encourages inter-model disagreement on wrong class probabilities and agreement on correct class probabilities between the ML models of the ensemble without the trade-off between the data fidelity component and the decorrelation component inherent in traditional ensembles.

With the updated loss function, the co-training of the machine learning models continues using the updated loss function, and the models are trained to agree on correct class probabilities but disagree in incorrect class probabilities, as in 412.

Figure 5:
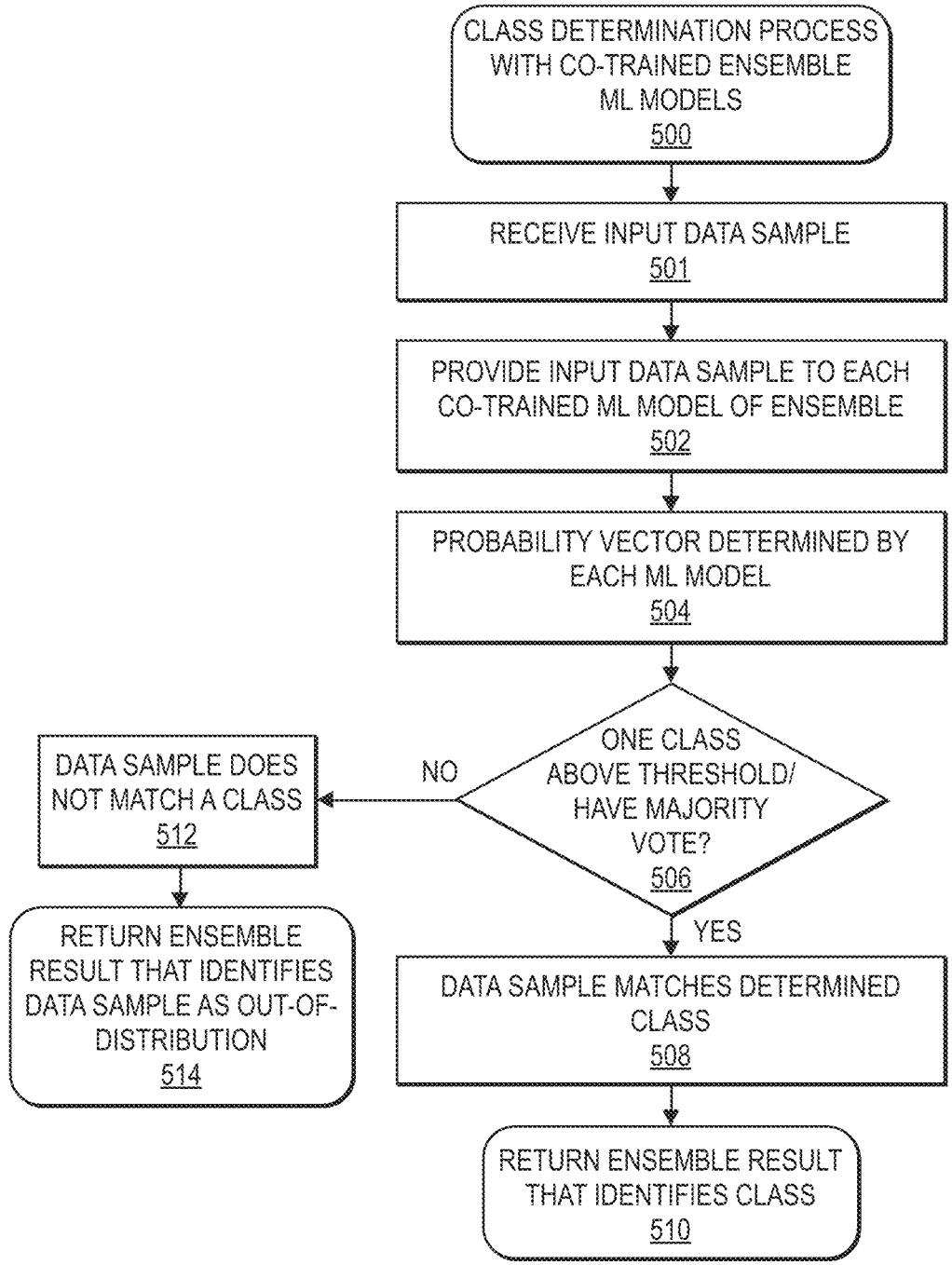
FIG. 5 is an example class determination process using an ensemble of co-trained machine learning models, in accordance with described implementations.

FIG. 5 is an example class determination process using an ensemble of co-trained machine learning models 500, in accordance with described implementations. The example process 500 may be performed once two or more ML models of an ensemble have been trained in accordance with the example ensemble ML model co-training process 400 discussed above with respect to FIG. 4.

The example process 500 begins upon receipt of a data sample to the ensemble of co-trained ML models, as in 501.

The received input data sample is then provided to each of the co-trained ML models of the ensemble for processing, as in 502. As discussed above, each of the co-trained ML models process the input data sample and generate a probability vector indicating a probability for each class of K classes that the input data sample corresponds to that class, as in 504. The combining function of the ensemble then determines, based on the determined probability vectors, if one class of the K classes is above a threshold, has the majority vote from the ML models, or has a highest average above all other classes, as discussed above, as in 506.

If it is determined that one class of the K classes is above a threshold, has the majority vote, or similar indication, it is determined that the data sample matches the determined class, as in 508. In response to a determination that the input data sample matches a class, an ensemble result is returned that identifies the class, as in 510.

However, if it is determined at decision block 506 that none of the combined probability scores for the classes exceed a threshold, that there is no majority class, or similar indication, it is determined that the input data sample does not match any of the K classes, as in 512. As a result of determining that the data sample does not match any of the K classes, an ensemble result is returned that identifies the data sample as out-of distribution, as in 514.

Figure 6:
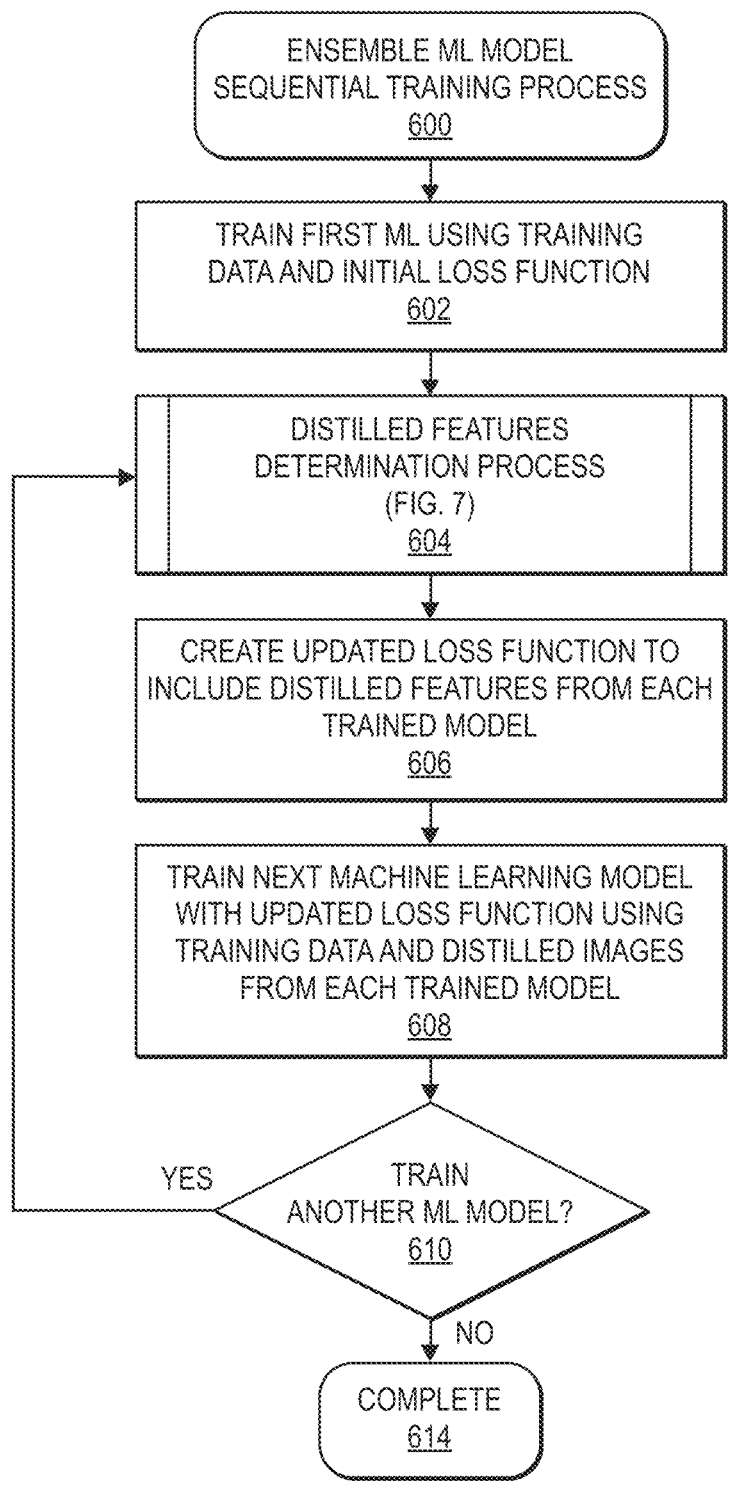
FIG. 6 is an example ensemble machine learning model sequential training process, in accordance with described implementations.

FIG. 6 is an example ensemble machine learning model sequential training process 600, in accordance with described implementations.

As discussed, the disclosed implementations that utilize sequential training of ML models of an ensemble encourage diverse extrapolation, which can be particularly important for open-set problems because open-sets often include different distributions of data when compared to the training data.

The example process 600 begins by training a first ML model of the ensemble with training data and with an initial loss function, as in 602. The initial loss function includes the individual model accuracy loss, such as the cross-entropy loss $L_{CE}$ discussed above.

Once trained, the distilled features determination process 700 (FIG. 7) is performed to determine distilled data samples for at least some of the training data samples, wherein the distilled data samples represent distilled features learned by the first ML model from at least some of the training data samples, as in 604. As discussed further below, a distilled data sample may be formed for each of the at least some training data samples and used to achieve diversification between ML models of the ensemble.

Likewise, based on the distilled features, the loss function is updated to include those distilled features, as in 606. For example, the loss function may be updated to include two components: the individual model accuracy loss (e.g., the cross-entropy loss $L_{CE}$) and the feature-based diversification component determined from the distilled features determined from first trained ML model of the ensemble. To encourage diversification through features, the second (or subsequent) ML model is penalized for using features learned by the first ML model, as represented by the feature-based diversification component, thereby forcing the second ML model to be agnostic to the features of the training data samples learned by the first ML model.

The feature-based diversification component added to the loss component reduces the distance between the correct class probability for a data sample and the average of the all classes probabilities, applied to the distilled data sample, $x_{f_1}$:

$$L_{FD}(x_{f_1}) = \left\| \frac{1}{n} \sum_{i=1}^{n} f_2^i(x_{f_1}) - f_2^k(x_{f_1}) \right\|$$

where k is the correct class (the one to which $x_{f_1}$ belongs). The updated loss function used with training of the second ML model of the ensemble is a weighted sum of both losses:

$$FDL(x, x_{f_1}) = (1-\alpha)L_{CE}(x) + \alpha L_{FD}(x_{f_1})$$

where $L_{CE}(x)$ is defined as above.

Returning to FIG. 6, with the updated loss function and the distilled data samples, the second or next ML model is trained with the updated loss function and using the original training data and the distilled data samples generated from any previously trained ML model, as in 608.

After training the second or next ML model, a determination is made as to whether another ML model is to be trained for the ensemble, as in 610. If it is determined that another ML model is to be trained, the example process 600 returns to block 604 and distilled features/distilled data samples are determined for the ML model that was just trained. If it is determined at decision block 610 that no additional ML models are to be trained, the example process 600 completes, as in 614.

As illustrated, the example process may be used to train any number of ML models for an ensemble. With each additional training, the loss function is updated to include the feature-based diversity component of each previously trained ML model for the ensemble and the training data is updated to include the training data samples and each of the distilled data samples determined from each of the trained ML models for the ensemble.

Figure 7:
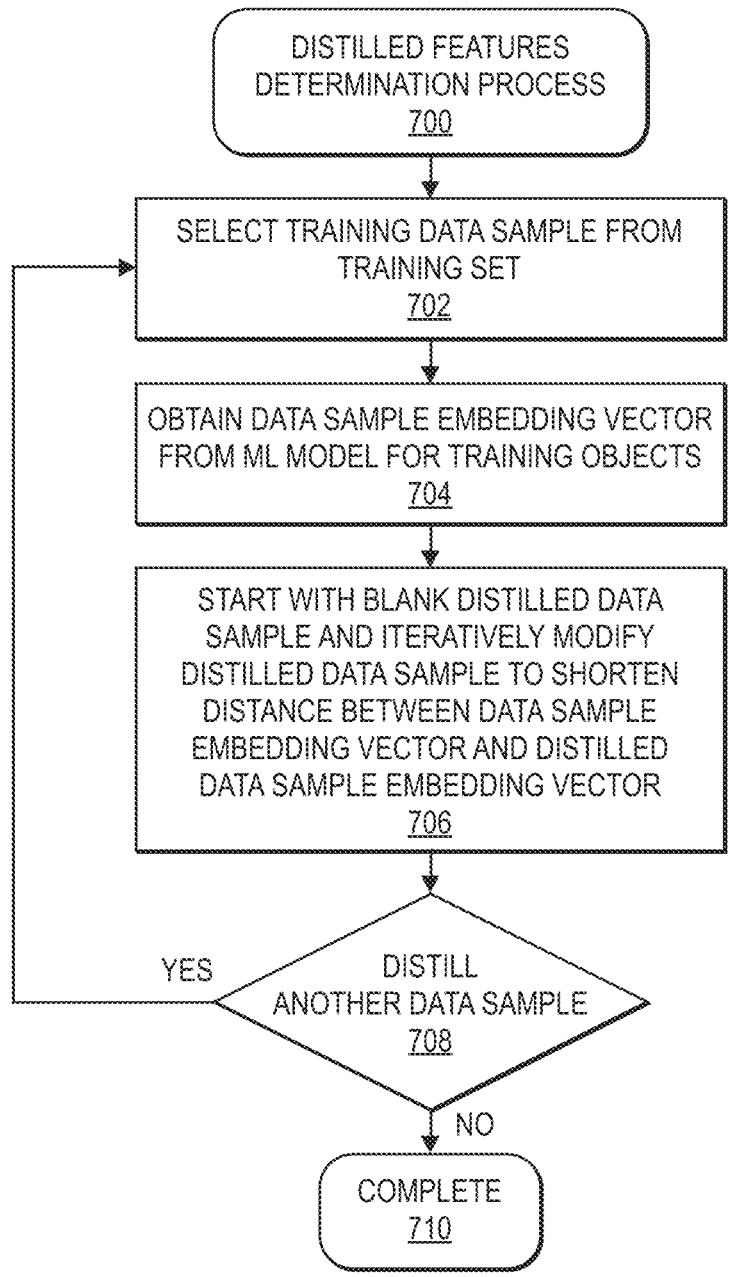
FIG. 7 is an example distilled features determination process, in accordance with described implementations.

FIG. 7 is an example distilled features determination process 700, in accordance with described implementations.

The example process 700 begins by selecting a training data sample from a training set used to train an ML model, as in 702. In some implementations, the distilled features determination process may be performed for all training data samples of a training set. In other implementations, for example, if multiple training data samples represent the same object, only one of those training data samples may be selected and distilled in accordance with the example process 700.

For the selected data sample, an embedding vector representative of that data sample is determined from the embedding space of the trained ML model, as in 704. To distill the features learned by the ML model from the selected data sample, a blank distilled data sample is generated and iteratively modified to shorten the distance between the distilled data sample embedding vector and the embedding vector of the data sample (the data sample embedding vector), as in 706. The direction may be computed by evaluating the gradient of the residual discrepancy $f_1(x_{f_1}) - f_1(x)$ with regard to $x_{f_1}$. The resulting distilled data sample exhibits the features that, from the point of view of the trained ML model, capture the essence or learned features of the selected data sample.

The iterative modification of the distilled data sample may be performed a defined number of times and/or until a defined minimum distance is achieved between the embedding vector of the selected data sample and the embedding vector of the distilled data sample.

Returning to FIG. 7, after generating the distilled data sample, a determination is made as to whether another training data sample is to be distilled, as in 708. If it is determined that another training data sample is to be distilled, the example process 700 returns to block 702 and continues with the next training data sample. If it is determined that no additional training data samples are to be distilled, the example process 700 completes, as in 710.

Figure 8:
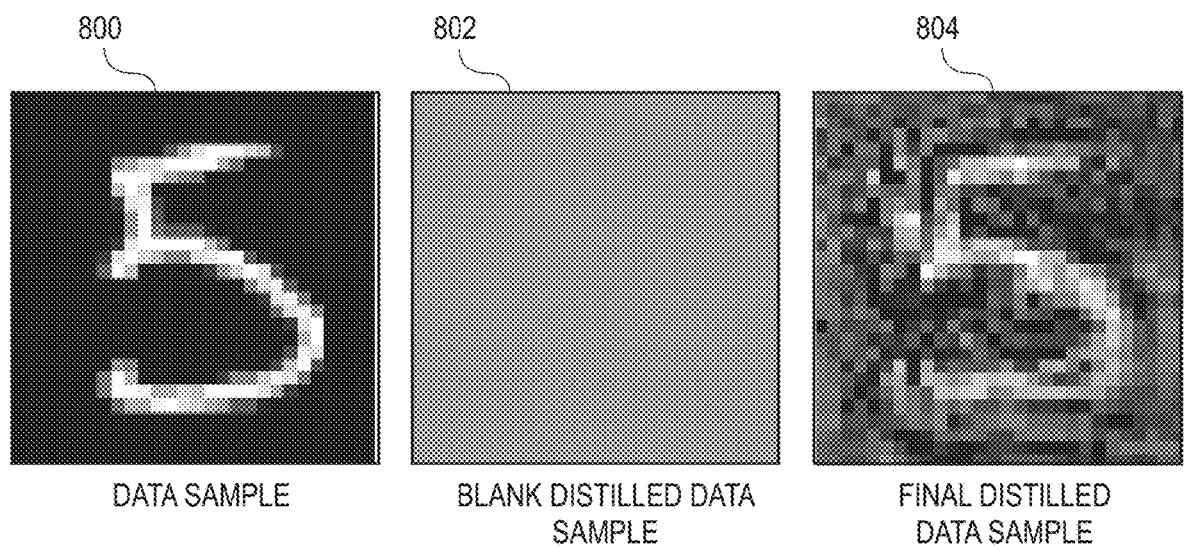
FIG. 8 is a block diagram illustrating a distilled image (distilled data sample) determined for a selected input image (input data sample) using the example distilled features determination process of FIG. 7, in accordance with described implementations.

FIG. 8 is a block diagram illustrating a distilled image 804 (distilled data sample) determined for a selected input image 800 (input data sample) using the example distilled features determination process 700 of FIG. 7, in accordance with described implementations.

In the illustrated example, the selected input data sample is an image data representative of the number five ("5"). As discussed, the process may start with a blank or empty distilled image 802, in this example a blank image (blank distilled data sample). The blank distilled image 802 is then iteratively modified, with each iteration moving the distilled image embedding vector (distilled data sample embedding vector) closer to the selected input image embedding vector (input data sample embedding vector) in the ML models embedding space. Upon completion of the iteration, the final distilled image 804 (final distilled embedding vector) includes the features of the selected input image 800 (input data sample) that were learned by the ML model to identify the selected input image 800 (input data sample).

Figure 9:
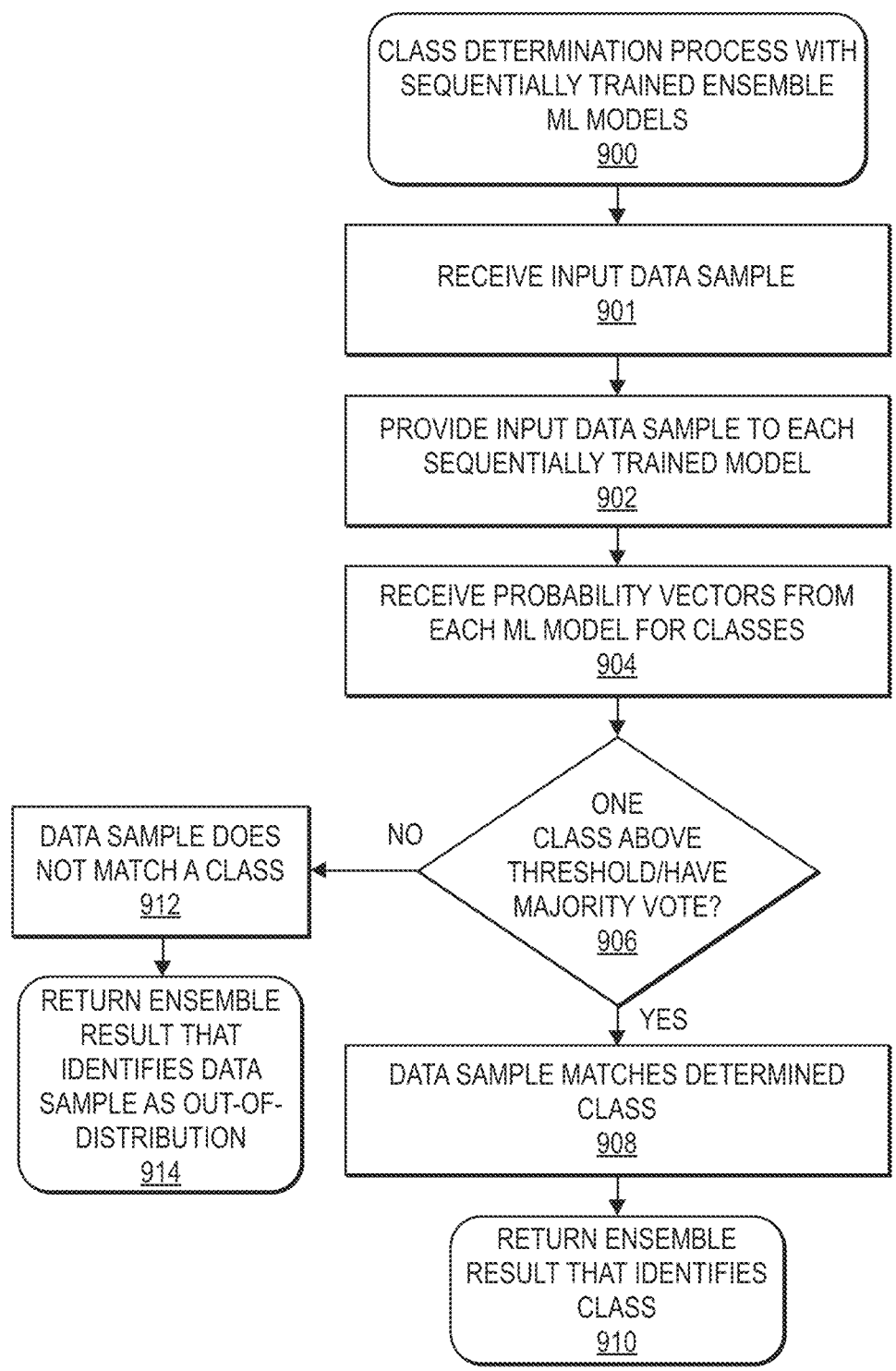
FIG. 9 is an example class determination process using an ensemble of sequentially trained ensemble machine learning models, in accordance with described implementations.

FIG. 9 is an example class determination process 900 using an ensemble of sequentially trained ensemble machine learning models, in accordance with described implementations. The example process 900 may be performed once two or more ML models of an ensemble that have been trained in accordance with the example ensemble ML model sequential training process 600 discussed above with respect to FIG. 6.

The example process 900 begins upon receipt of a data sample to the ensemble of sequentially trained ML models, as in 901.

The received input data sample is then provided to each of the sequentially trained ML models of the ensemble for processing, as in 902. As discussed above, each of the sequentially trained ML models process the input data sample and generate a probability vector indicating a probability for each class of the K classes that the input data sample corresponds to that class, as in 904. The combining function of the ensemble then determines, based on the determined probability vectors, if one class of the K classes is above a threshold, has the majority vote from the ML models, or has a highest average above all other classes, as discussed above, as in 906.

If it is determined that one class of the K classes is above a threshold, has the majority vote, or similar indication, it is determined that the data sample matches the determined class, as in 908. In response to a determination that the input data sample matches a class, an ensemble result is returned that identifies the class, as in 910.

However, if it is determined at decision block 906 that none of the combined probability scores for the classes exceed a threshold, that there is no majority class, or similar indication, it is determined that the input data sample does not match any of the K classes, as in 912. As a result of determining that the data sample does not match any of the K classes, an ensemble result is returned that identifies the data sample as out-of distribution, as in 914.

Figure 10:
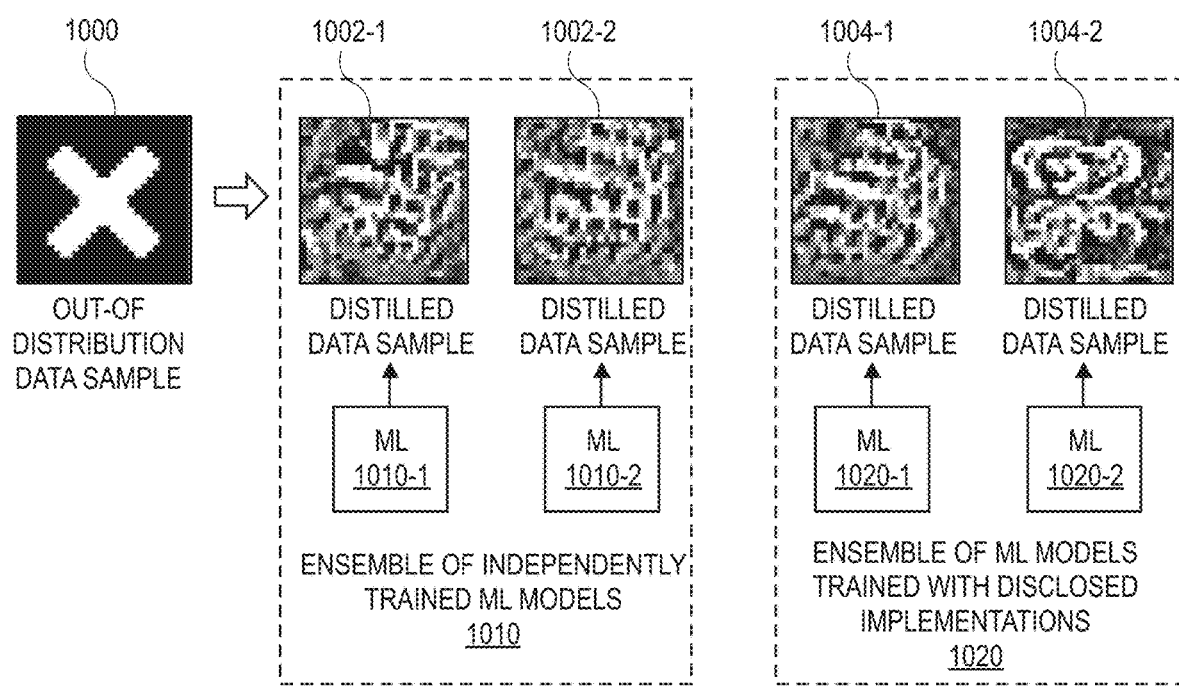
FIG. 10 is a block diagram illustrating the difference between distilled images (distilled data samples) generated from ML models of an ensemble of independently trained ML models compared to distilled images (distilled data samples) generated from ML models of an ensemble trained in accordance with described implementations.

FIG. 10 is a block diagram illustrating the difference between distilled data samples 1002-1, 1002-2 generated from ML models 1010-1 and 1010-2 of an ensemble 1010 of independently trained ML models compared to distilled data samples 1004-1, 1004-2 generated from ML models 1020-1, 1020-2 of an ensemble 1020 trained in accordance with one or more of the described implementations.

In the illustrated example, the input data sample 1000 is an out-of distribution data sample (i.e., the data sample does not correspond to any of the K-classes for which the ensembles were trained). For all of the distilled data samples 1002-1, 1002-2, 1004-1, 1004-2, none of the features make any sense, as expected, because the input data sample 1000 is not from the training set distribution used to train any of the ML models 1010-1, 1010-2, 1020-1, 1020-2. However, as illustrated, the two distilled data samples 1002-1 and 1002-2, produced from a traditional ensemble, that includes independently trained ML models 1010-1, 1010-2, are similar. In comparison, the distilled data samples 1004-1 and 1004-2 determined from the ML models 1020-1, 1020-2 of the ensemble 1020, that are trained in accordance with one or more of the disclosed implementations, differ. For example, the ML models 1020-1 and 1020-2 may be co-trained using the implementations discussed above with respect to FIGS. 4 through 5 or may be sequentially trained using the implementations discussed above with respect to FIGS. 6 through 8.

In addition, in the illustrated example, when providing the out-of distribution data sample 1000 to the ML models 1010-1, 1010-2 of the traditional ensemble 1010 of independently trained ML models 1010-1, 1010-2, both ML models 1010-1, 1010-2 predict the same wrong class, in this example class 7. As a result, the ensemble 1010 would provide an ensemble result that would identify the incorrect class for the data sample. In comparison, the two ML models 1020-1, 1020-2 of the ensemble 1020 trained in accordance with one or more of the disclosed implementations, predict different classes, in this example, class 7 and class 2, respectively. This disagreement indicates that the input data sample 1000 is out-of distribution. As a result, the ensemble with ML models trained in accordance with the disclosed implementations will correctly provide an ensemble result that identifies the data sample 1000 as an out-of distribution data sample.

Figure 11:
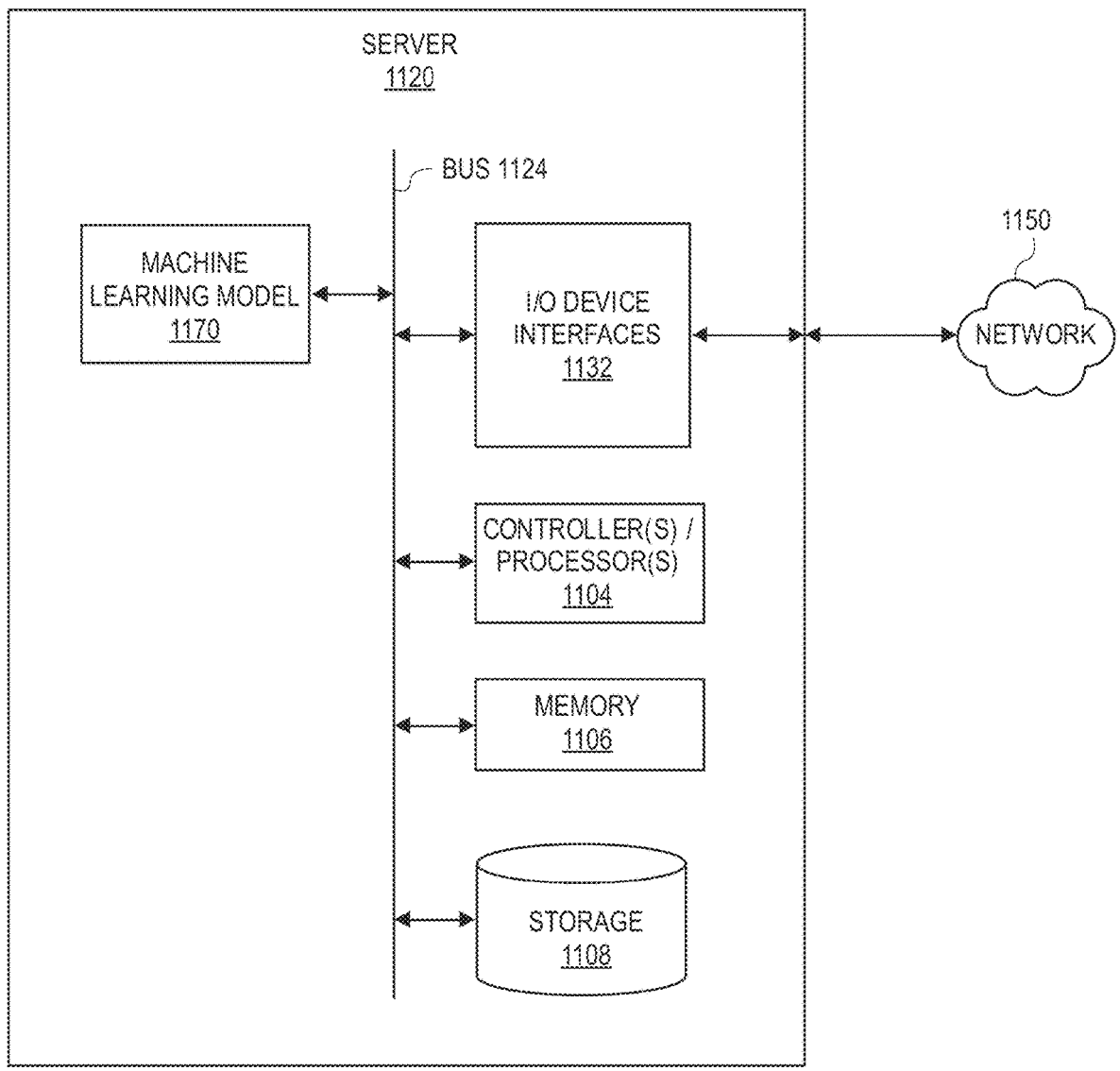
FIG. 11 illustrates example components of a server, in accordance with described implementations.

FIG. 11 is a block diagram conceptually illustrating example components of a remote computing device, such as a remote server 1120 that may include and/or execute one or more of the machine learning models and/or training of ensembles of models in accordance with described implementations. Multiple such servers 1120 may be included in the system, such as one server(s) 1120 for each machine learning model. In operation, each of these devices (or groups of devices) may include computer-readable and computer-executable instructions that reside on the respective server(s) 1120, as will be discussed further below.

Each of these server(s) 1120 may include one or more controllers/processors 1104, that may each include a central processing unit (CPU) for processing data and computer-readable instructions, and a memory 1106 for storing data and instructions of the respective device. The memories 1106 may individually include volatile random access memory (RAM), non-volatile read only memory (ROM), non-volatile magnetoresistive (MRAM) and/or other types of memory. Each server may also include a data storage component 1108, for storing data, controller/processor-executable instructions, training data, distilled data samples, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 1150 (e.g., the Internet) through respective input/output device interfaces 1132.

Computer instructions for operating each server 1120 and its various components may be executed by the respective server's controller(s)/processor(s) 1104, using the memory 1106 as temporary "working" storage at runtime. A server's computer instructions may be stored in a non-transitory manner in non-volatile memory 1106, storage 1108, or an external device(s). Alternatively, some or all of the executable instructions may be embedded in hardware or firmware on the respective device in addition to or instead of software.

Each server 1120 includes input/output device interfaces 1132. A variety of components may be connected through the input/output device interfaces. Additionally, each server 1120 may include an address/data bus 1124 for conveying data among components of the respective server. Each component within a server 1120 may also be directly connected to other components in addition to (or instead of) being connected to other components across the server 1120.

Each server may also include one or more machine learning models 1170 of an ensemble of machine learning models, such as a CNN. As discussed above, the machine learning model 1170 of an ensemble may be trained for diversification within the ensemble and to process data for an open set of potential input data samples, as discussed above.

The components of the server(s) 1120, as illustrated in 11, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to train each of a plurality of machine learning models of an ensemble of machine learning models, comprising:
    training a first machine learning model of the plurality of machine learning models using an initial loss function and training data that includes a plurality of training images to produce a first trained machine learning model;
    determining, based at last in part on the training, a plurality of distilled images corresponding to a first plurality of features of the training images learned by the first machine learning model;
    generating, based at least in part on the distilled images, a feature-based diversification component that, when used to train a second machine learning model of the plurality of machine learning models of the ensemble, causes the second machine learning model to be agnostic to the first plurality of features of the training images learned by the first machine learning model;
    generating an updated loss function that includes the feature-based diversification component; and
    training the second machine learning model of the plurality of machine learning models using the updated loss function and training data that includes the plurality of training images and the plurality of distilled images to produce a second trained machine learning model that is trained to be agnostic to the first plurality of features learned by the first machine learning model.

2. The computer-implemented method of claim 1, wherein generating the feature-based diversification component includes:
    obtaining a first embedding vector from the first machine learning model for a training image of the plurality of training images; and
    generating a distilled image of the plurality of distilled images by iteratively modifying the distilled image to shorten a distance between a second embedding vector of the distilled image and the first embedding vector.

3. The computer-implemented method of claim 1, wherein the training data includes:
    a first plurality of in-distribution training images, each of the first plurality of in-distribution training images corresponding to a class of a plurality of classes.

4. The computer-implemented method of claim 1, further comprising:
    providing a first image corresponding to a first class of a plurality of classes to the ensemble that includes the first trained machine learning model and the second trained machine learning model; and
    receiving, from the ensemble, an ensemble result that indicates that the first image corresponds to the first class of the plurality of classes.

5. The computer-implemented method of claim 1, further comprising:
    providing a first image that does not correspond to any class of a plurality of classes to the ensemble that includes the first trained machine learning model and the second trained machine learning model; and
    receiving, from the ensemble, an ensemble result that indicates that the first image does not correspond to any class of the plurality of classes.

6. A computing system, comprising:
    one or more processors; and
    a memory storing program instructions that when executed by the one or more processors, cause the one or more processors to at least:
        train a first machine learning model of a plurality of machine learning models of an ensemble using an initial loss function and training data that includes a plurality of training data samples to produce a first trained machine learning model;
        determine, for each of at least some of the training data samples, a plurality of distilled data samples corresponding to a first plurality of features of the at least some of the training data samples learned by the first machine learning model;
        generate a feature-based diversification component that, when used to train a second machine learning model of the plurality of machine learning models of the ensemble, causes the second machine learning model to be agnostic to the first plurality of features learned by the first machine learning model; and train the second machine learning model of the plurality of machine learning models of the ensemble using training data that includes the plurality of training data samples and the plurality of distilled data samples to produce a second trained machine learning model that is trained to be agnostic to the first plurality of features learned by the first machine learning model.

7. The computing system of claim 6, wherein:
the program instructions that, when executed by the one or more processors to generate the feature-based diversification component, further cause the one or more processors to at least generate the feature-based diversification component based at least in part on the distilled data samples;
and
wherein the program instructions that, when executed by the one or more processors to cause the processors to train the second machine learning model further include instructions that, when executed by the one or more processors, further cause the one or more processors to at least train the second machine learning model of the plurality of machine learning models using an updated loss function that includes the feature-based diversification component and training data that includes the plurality of training data samples and the plurality of distilled data samples.

8. The computing system of claim 6, wherein the program instructions that, when executed by the one or more processors, further cause the one or more processors to at least:
subsequent to training the second machine learning model:
determine, for each of at least some of the training data samples, a second plurality of distilled data samples corresponding to a second plurality of features of the at least some of the training data samples learned by the second machine learning model, wherein:
the second plurality of features are different than the first plurality of features; and
the second plurality of distilled data samples are different than the plurality of distilled data samples; and
train a third machine learning model of the plurality of machine learning models using training data that includes the plurality of training data samples, the plurality of distilled data samples, and the second plurality of distilled data samples to produce a third trained machine learning model that is trained to be agnostic to the first plurality of features and the second plurality of features.

9. The computing system of claim 6, wherein a second loss function that is different than the initial loss function is used in training the second machine learning model.

10. The computing system of claim 9, wherein the second loss function includes a cross-entropy loss and the feature-based diversification component is determined based at least in part on the distilled data samples.

11. The computing system of claim 6, wherein the program instructions that, when executed by the one or more processors, further cause the one or more processors to at least:
receive an input data sample to the ensemble;
determine, with the first trained machine learning model, for each class of a plurality of classes, a first probability that the input data sample corresponds with the class;
determine, with the second trained machine learning model, for each class of the plurality of classes, a second probability that the input data sample corresponds with the class;
determine, based at least in part on the first probabilities and the second probabilities, that the input data sample corresponds to a first class of the plurality of classes; and
produce an ensemble result indicating that the input data sample corresponds to the first class.

12. The computing system of claim 6, wherein the program instructions that, when executed by the one or more processors further cause the one or more processors to at least:
receive an input data sample to the ensemble;
determine, with the first trained machine learning model, for each class of a plurality of classes, a first probability that the input data sample corresponds with the class;
determine, with the second trained machine learning model, for each class of the plurality of classes, a second probability that the input data sample corresponds with the class;
determine, based at least in part on the first probabilities and the second probabilities, that the input data sample does not correspond to a class of the plurality of classes; and
produce an ensemble result indicating that the input data sample does not correspond to a class of the plurality of classes.

13. The computing system of claim 6, wherein the ensemble is applied to an open data set.

14. The computing system of claim 6, wherein the training of the second machine learning model teaches the second machine learning model to identify data samples based on second features that are different than features of the at least some of the training data samples learned by the first machine learning model.

15. The computing system of claim 6, wherein the program instructions, that when executed by the one or more processors to determine a plurality of distilled data samples further include instructions that, when executed by the one or more processors further cause the one or more processors to at least:
obtain a first embedding vector from the first machine learning model for a training data sample of the plurality of training data samples; and
generate a distilled data sample by iteratively modifying a blank distilled data sample to shorten a distance between a second embedding vector of the distilled data sample and the first embedding vector.

16. A computer-implemented method, comprising:
training a first machine learning model of an ensemble of machine learning models that includes a plurality of machine learning models, wherein the training of the first machine learning model uses a loss function and a plurality of training data samples;
determining, for the first machine learning model, a plurality of distilled data samples indicative of features learned by the first machine learning model;
generating a second loss function that includes a feature-based diversification component determined based at least in part on the plurality of distilled data samples, wherein the feature-based diversification component, when used to train a second machine learning model of the plurality of machine learning models of the ensemble, causes the second machine learning model to be agnostic to features of the training data samples learned by the first machine learning model; and training the second machine learning model of the plurality of machine learning models of the ensemble using the second loss function and the plurality of training data samples to produce a second trained machine learning model that is trained to be agnostic of features learned by the first machine learning model.

17. The computer implemented method of claim 16, wherein training the second machine learning model further includes:

training the second machine learning model of the plurality of machine learning models of the ensemble using the second loss function, the plurality of training data samples, and the plurality of distilled data samples.

18. The computer implemented method of claim 17, further comprising:

determining, for the second machine learning model, a second plurality of distilled data samples indicative of second features learned by the second machine learning model, wherein the second features are different than the features;

generating a third loss function that includes the feature-based diversification component and a second feature-based diversification component determined based at least in part on the second plurality of distilled data samples; and training a third machine learning model of the plurality of machine learning models of the ensemble using the third loss function and the plurality of training data samples to produce a third trained machine learning model that is trained to be agnostic to features learned by the first machine learning model and the second features learned by the second machine learning model.

19. The computer-implemented method of claim 16, wherein the second loss function further includes a cross-entropy loss.

20. The computer-implemented method of claim 16, further comprising:

obtaining a first embedding vector from the first machine learning model for a training data sample of the plurality of training data samples; and generating a distilled data sample by iteratively modifying a blank distilled data sample to shorten a distance between a second embedding vector of the distilled data sample and the first embedding vector.

\* \* \* \* \*